(12) United States Patent
Bandura et al.

(10) Patent No.: US 10,571,585 B2
(45) Date of Patent: Feb. 25, 2020

(54) SYSTEM AND METHOD FOR TIME-LAPSING SEISMIC IMAGING

(71) Applicant: CHEVRON U.S.A. INC., San Ramon, CA (US)

(72) Inventors: Laura L. Bandura, Houston, TX (US); Lisa R. Goggin, Houston, TX (US); Adam D. Halpert, Houston, TX (US); Ke Wang, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 305 days.

(21) Appl. No.: 15/252,411

(22) Filed: Aug. 31, 2016

(65) Prior Publication Data

US 2018/0059273 A1 Mar. 1, 2018

(51) Int. Cl.
*G01V 1/30* (2006.01)
(52) U.S. Cl.
CPC ............ *G01V 1/308* (2013.01); *G01V 1/306* (2013.01); *G01V 2210/6122* (2013.01); *G01V 2210/63* (2013.01)
(58) Field of Classification Search
None
See application file for complete search history.

(56) References Cited

U.S. PATENT DOCUMENTS

| 5,085,502 | A | | 2/1992 | Womack et al. | |
|---|---|---|---|---|---|
| 5,583,825 | A | * | 12/1996 | Carrazzone | G01V 1/288 367/31 |
| 7,616,524 | B1 | * | 11/2009 | Gersztenkorn | G01V 1/30 367/38 |
| 7,769,546 | B2 | * | 8/2010 | Lomask | G01V 1/301 367/72 |
| 8,462,207 | B2 | | 6/2013 | Garcia et al. | |
| 2007/0255501 | A1 | * | 11/2007 | Kellogg | G01V 1/28 702/16 |
| 2009/0204331 | A1 | * | 8/2009 | Lomask | G01V 1/301 702/16 |
| 2010/0149917 | A1 | * | 6/2010 | Imhof | G01V 1/345 367/53 |
| 2012/0197532 | A1 | * | 8/2012 | Posamentier | G01V 1/345 702/14 |
| 2012/0241166 | A1 | * | 9/2012 | Sun | G01V 1/30 166/369 |

(Continued)

FOREIGN PATENT DOCUMENTS

| CN | 103940371 A | 7/2014 |
|---|---|---|
| CN | 102768025 B | 1/2015 |
| EP | 2015022 A1 | 1/2009 |

OTHER PUBLICATIONS

PCT International Search Report and Written Opinion, International Application No. PCT/US2017/041865, dated Oct. 9, 2017, pp. 1-13.
H. Canabal et al., Automatic processing in moiré deflectometry by local fringe direction calculation, (1998) Optical Society of America.
F.P. Chiang et al., An optical method of generating slope and curvature contours of bent plates, (1979) International J. Solids Structures vol. 15 pp. 251-260.

(Continued)

*Primary Examiner* — Lina M Cordero
(74) *Attorney, Agent, or Firm* — Marie L. Clapp

(57) ABSTRACT

A method is described for time-lapse seismic imaging that may include detecting moiré patterns in seismic images generated from time-lapse seismic data and identifying geologic features based on the moiré patterns. The method may be executed by a computer system.

5 Claims, 11 Drawing Sheets

(56) References Cited

U.S. PATENT DOCUMENTS

| | | | | |
|---|---|---|---|---|
| 2013/0030710 A1* | 1/2013 | Lomask | ............... | G01V 1/30 |
| | | | | 702/17 |
| 2013/0289879 A1* | 10/2013 | Grandi | ............... | G01V 1/30 |
| | | | | 702/6 |
| 2014/0247969 A1* | 9/2014 | Srigiriraju | ............ | G01V 1/362 |
| | | | | 382/109 |
| 2014/0253929 A1 | 9/2014 | Huang et al. | | |
| 2015/0117144 A1* | 4/2015 | Sun | ............... | G01V 1/303 |
| | | | | 367/7 |
| 2015/0199845 A1* | 7/2015 | Zinck | ............... | G01V 1/30 |
| | | | | 382/109 |
| 2015/0316685 A1* | 11/2015 | Dimitrov | ............ | G01V 1/302 |
| | | | | 703/2 |
| 2015/0331123 A1* | 11/2015 | Guigne | ............ | G01V 1/34 |
| | | | | 702/16 |
| 2016/0061976 A1* | 3/2016 | Hu | ............... | G01V 1/48 |
| | | | | 367/7 |
| 2018/0356211 A1* | 12/2018 | Otsuka | ............ | G01B 11/165 |

OTHER PUBLICATIONS

K. Creath et al., Moiré and Fringe Projection Techniques, (1992) Optical Shop Testing, Second Ed., John Wiley & Sons Inc.

J. Degrieck et al., Application of Digital Phase-shift Shadow Moiré to Micro Deformation Measurements of Curved Surfaces, (2001) Optics and Lasers in Engineering, 36, 29-40.

Y. Fu et al., Fringe projection profilometry based on a novel phase shift method (2011) Optical Society of America.

S. S. Gorthi et al., Fringe Projection Techniques: Whither we are? (2010) Optics and Lasers in Engineering, 48(2):133-140.

W. Wang, Moiré Method, (2011) University of Washington ME 557.

\* cited by examiner

SYSTEM AND METHOD FOR TIME-LAPSING SEISMIC IMAGING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for deriving seismic images of the subsurface from geophysical seismic data and, in particular, to a method of identifying time-lapse changes in time-lapse seismic images derived from time-lapse seismic data based on moiré patterns in order to facilitate the production of hydrocarbons.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in measurable properties of the seismic waves, including their direction of propagation, signal strength, phase, and amplitude, among other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors. The recorded waveforms (peaks and troughs, often referred to as seismic wavelets) are a quantitative characterization of the geologic boundaries, or subsurface reflectors. Seismic reflection occurs at every location where there is a change in rock or fluid properties. In addition to seismic data recorded in the field, it is also possible to generate synthetic seismic data with a computer that models the seismic sources and computes the propagation of the seismic energy, including reflections, and the seismic data that would be recorded at synthetic seismic sensors.

Seismic data is processed to create digital seismic images that can be interpreted to identify subsurface geologic features including hydrocarbon deposits. Continuous, coherent reflectors seen in the seismic image can be described as complex 3D surfaces with a trackable dip. 3-D digital seismic images may contain a nearly infinite number of these highly complex dipping surfaces.

The seismic wavelets' amplitude and phase respond directly to variations in rock and fluid properties, and depths at which these changes in properties occur are physical boundaries which may be computed from seismic data when they are properly mapped. It is critical that these data be mapped at the highest resolution possible in order to achieve an accurate subsurface description.

Time-lapse (also called 4D) seismic monitoring involves at least two seismic surveys. The first survey is referred to as a baseline survey and usually provides a seismic image of the subsurface prior to production of hydrocarbons contained therein. Subsequent surveys are called monitor surveys. A monitor seismic dataset is representative of the same subsurface volume as the baseline seismic dataset and, in general, undergoes the same processing as the baseline seismic dataset to produce a monitor seismic image. The monitor seismic survey is usually performed months or years after the baseline survey, after hydrocarbons have been produced from the subsurface reservoir, and often after additional recovery techniques such as water flooding or steam injection. Differences between the baseline seismic image and the monitor seismic image indicate subsurface rock and fluid property changes within the reservoir.

The ability to define, at high granularity, the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved quantification of subsurface changes detectable with time-lapse seismic images that will facilitate enhanced production of potential hydrocarbon reservoirs.

SUMMARY

In accordance with some embodiments, a method of time-lapse seismic imaging may include receiving a baseline digital seismic image representative of a subsurface volume of interest including a hydrocarbon reservoir; computing a baseline tau volume containing transforms that will flatten the baseline digital seismic image; receiving a monitor digital seismic image representative of the subsurface volume of interest; flattening the a monitor digital seismic image using the baseline tau volume to generate a digital flattened monitor image; detecting moiré patterns in the digital flattened monitor image; computing a change in velocity based on the moiré patterns; and identifying physical changes in the subsurface volume of interest based on the digital flattened monitor image and the change in velocity.

In accordance with other embodiments, a method of time-lapse seismic imaging may include receiving a baseline digital seismic image representative of a subsurface volume of interest including a hydrocarbon reservoir; receiving a monitor digital seismic image representative of the subsurface volume of interest; subtracting the monitor digital seismic image from the baseline digital seismic image to generate a digital difference image; detecting moiré patterns in the digital difference image; and identifying physical changes in the subsurface volume of interest based on the digital difference image.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of time-lapse seismic imaging. These embodiments are designed to be of particular use for time-lapse seismic imaging of subsurface volumes that may have subsurface rock and fluid property changes due to hydrocarbon production.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs and efficiently extract the hydrocarbons (also called production). Seismic data is acquired at a surface (e.g. the earth's surface, ocean's surface, or at the ocean bottom) as seismic traces which collectively make up the seismic dataset. The seismic data is processed to generate digital seismic images. For decision-making purposes, the location of subsurface rock boundaries is communicated using seismic mapping, the process by which rugose 3-dimensional rock boundaries are displayed on a flat plane using a computer.

The present invention includes embodiments of methods and systems for time-lapse seismic imaging based on moiré pattern identification. The present invention improves identification of subsurface changes manifesting as time shifts of events in the monitor digital seismic image. This improves decisions impacting budgetary planning, obtaining mineral and lease rights, signing well commitments, permitting rig locations, designing well paths and drilling strategy, preventing subsurface integrity issues, planning proper casing and cementation strategies, and selecting and purchasing appropriate completion and production equipment.

Figure 1:
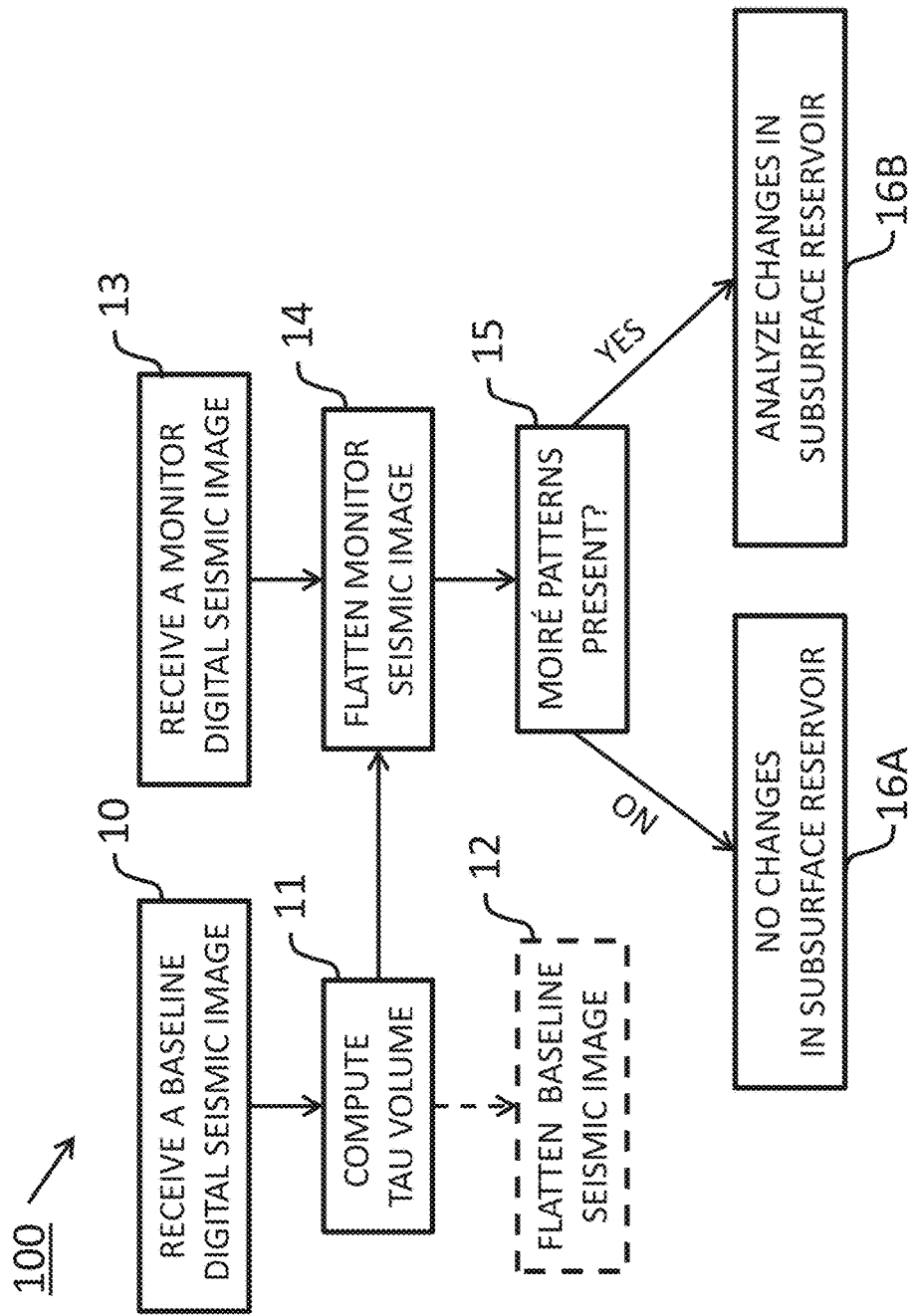
FIG. 1 illustrates a flowchart of a method of time-lapse seismic imaging, in accordance with some embodiments.

FIG. 1 illustrates a flowchart of a method 100 for time-lapse seismic imaging based on volumetric flattening. At operation 10, a baseline digital seismic image is received. As previously described, a seismic dataset including a plurality of traces was recorded at a plurality of seismic sensors, either in the field or as a synthetic seismic survey modeled by a computer. The seismic image is generated from a seismic dataset that may have been subjected to a number of seismic processing steps, such as deghosting, multiple removal, spectral shaping, and some type of seismic imaging such as migration. These examples are not meant to be limiting. Those of skill in the art will appreciate that there are a number of useful seismic processing steps that may be applied to seismic data to create a seismic image.

At operation 11, a tau volume is computed. A tau volume provides the transform between seismic sample locations in the raw cube (original seismic image) and locations in the flattened cube (flattened seismic image). The tau volume can be computed in a number of ways. For example, the tau volume may be computed based on the method described by U.S. Pat. No. 7,769,546, Method for Indexing a Subsurface Volume For The Purpose of Inferring Geologic Information, or U.S. patent application Ser. No. 14/595,964, System and Method for Generating a Depositional Sequence Volume from Seismic Data. This tau volume may optionally be applied to the baseline seismic image to flatten the baseline seismic image 12. In some instances, flattening the baseline seismic image may be used to verify the accuracy of the tau volume; if the baseline seismic image is not properly flattened, the parameterization of operation 11 may be slightly altered and repeated until a tau volume that results in a satisfactorily flattened baseline seismic image is obtained.

Referring again to FIG. 1, a monitor digital seismic image is received 13. As previously described, a monitor seismic survey was obtained over the same subsurface volume as the baseline seismic survey. The monitor seismic dataset was subjected to a similar seismic data processing flow as the baseline seismic dataset, resulting in a monitor digital seismic image that should be substantially similar to the baseline digital seismic image. This monitor digital seismic image is now flattened 14 using the tau volume computed from the baseline digital seismic image 11.

Figure 3:
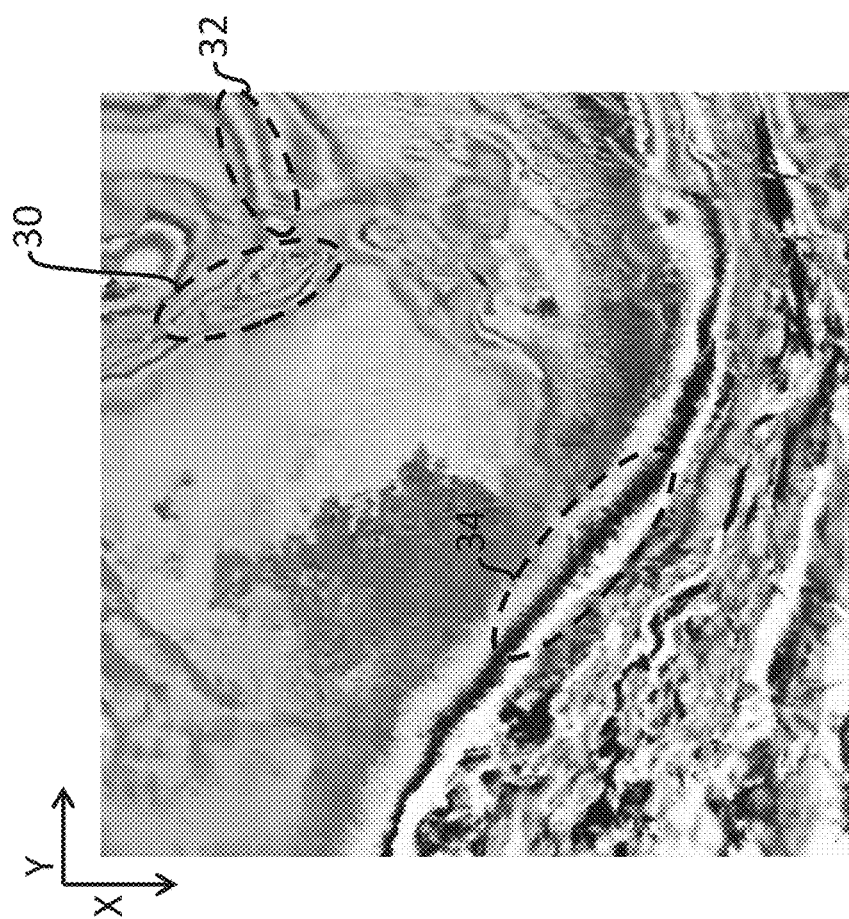
FIG. 3 is an example of a flattened seismic imaging with banding indicative of moiré patterns.
Figure 4:
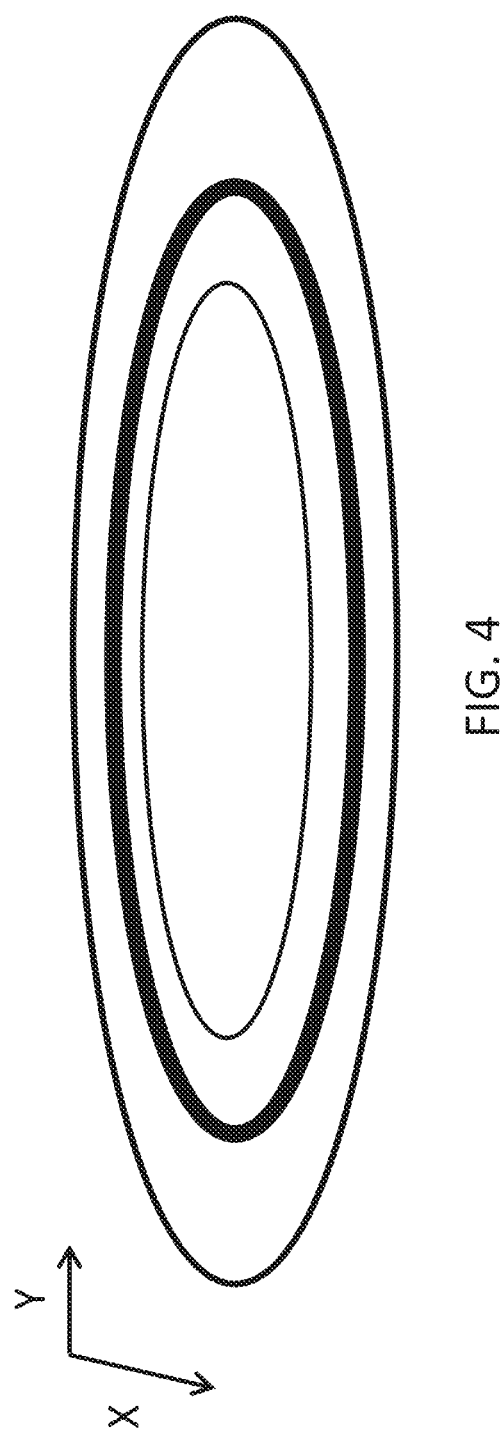
FIG. 4 is a diagram of a moiré pattern.
Figure 5:
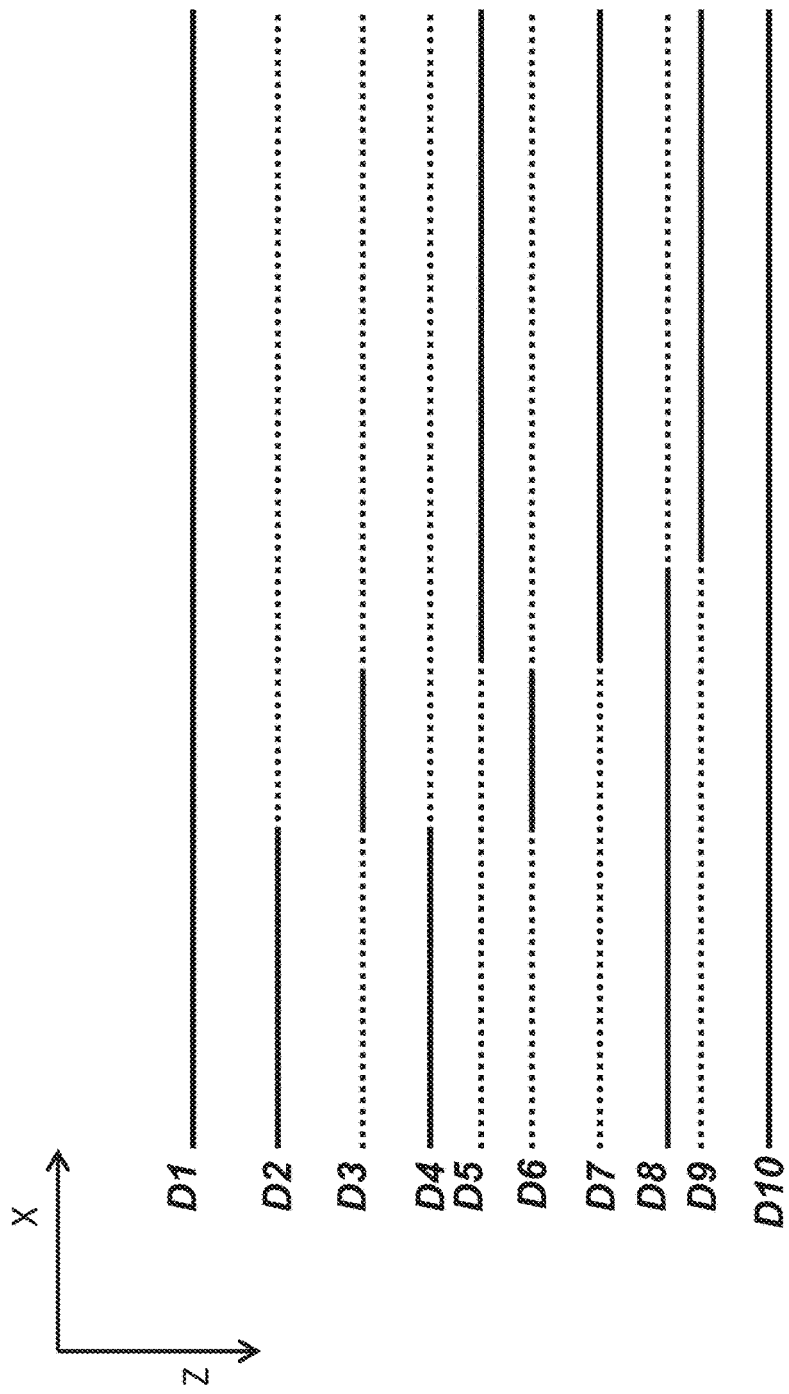
FIG. 5 is a diagram of a flattened seismic section.

The result of operation 14 is a flattened monitor seismic image, based on the tau volume transforms computed from the baseline seismic image. If there are no subsurface rock and fluid property changes between the time of the baseline survey and the monitor survey, the tau volume should flatten the monitor seismic image in a manner identical to the baseline image. However, if there are changes, the flattened monitor seismic image will not be flat everywhere and will exhibit clear differences when compared to the flattened baseline image. Existing seismic interpretation software packages such as Schlumberger's Petrel and Paradigm's EPOS suite allow rapid movement of planar viewing surfaces (vertical and horizontal) through 3D seismic images. When a seismic image is properly flattened, the rapid movement of a horizontal visualization plane through the data reveals the morphological form of and facies changes associated with geologic boundaries. When discordance exists between this planar viewing surface and the seismic reflectors, moiré patterns (a type of imaging artifact created by inaccuracies in trace-to-trace phase correlation) are evident, as seen in FIG. 3 where areas 30, 32, and 34 show banding. Moiré patterns exhibit predictable visible sweep when the viewing plane is moved up or down through the seismic volume. This predictable sweep is a function of the measurable discordance between the viewing plane and the incorrectly mapped reflector in flattened space. At operation 15, the flattened monitor seismic image is examined to determine if moiré patterns exist. A simple example of a moiré pattern can be seen in FIG. 4 on a single depth slice of the flattened image. FIG. 5 is a flattened section (the vertical axis is depth) wherein the solid lines represent the flattened seismic events for each depth D1-D10. The dotted lines are not actual seismic events but are there for reference purposes.

Figure 2:
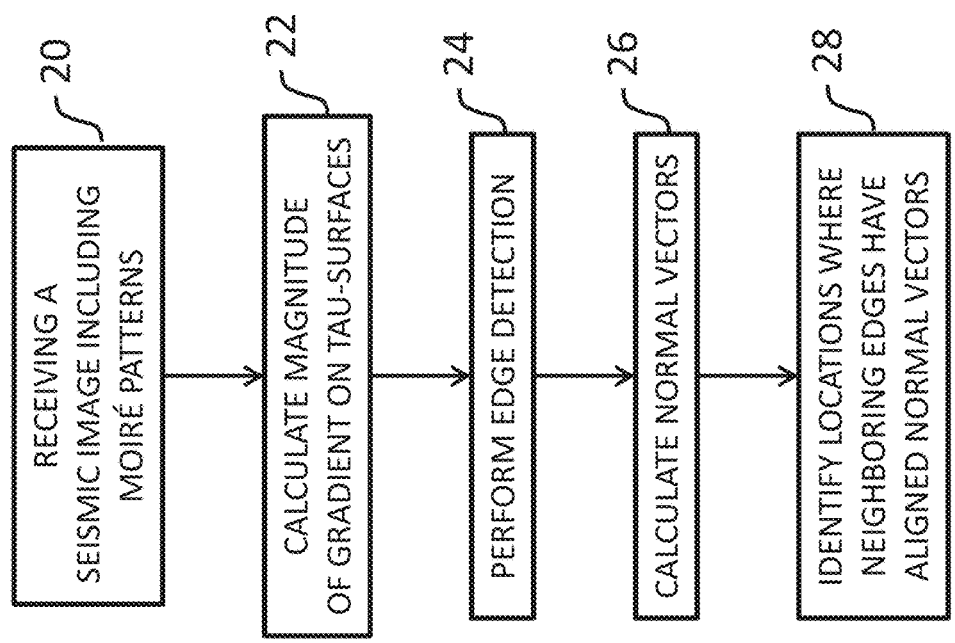
FIG. 2 illustrates a flowchart for one step of the method of time-lapse seismic imaging, in accordance with some embodiments.
Figure 6B:
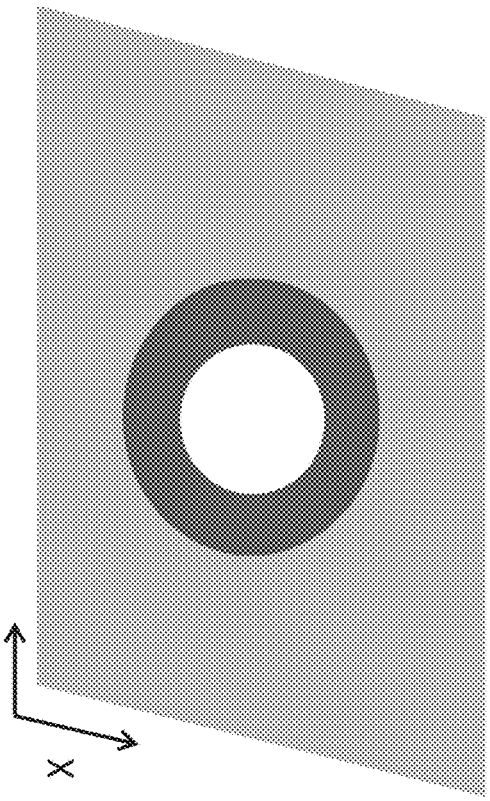
FIG. 6B is a map view diagram of a moiré pattern on a depth slice adjacent to that of FIG. 6A.
Figure 6A:
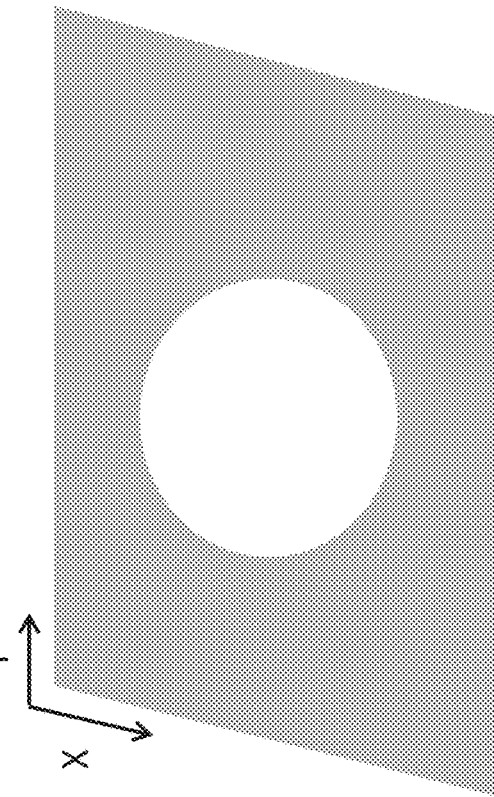
FIG. 6A is a map view diagram of a moiré pattern on a depth slice.
Figure 7A:
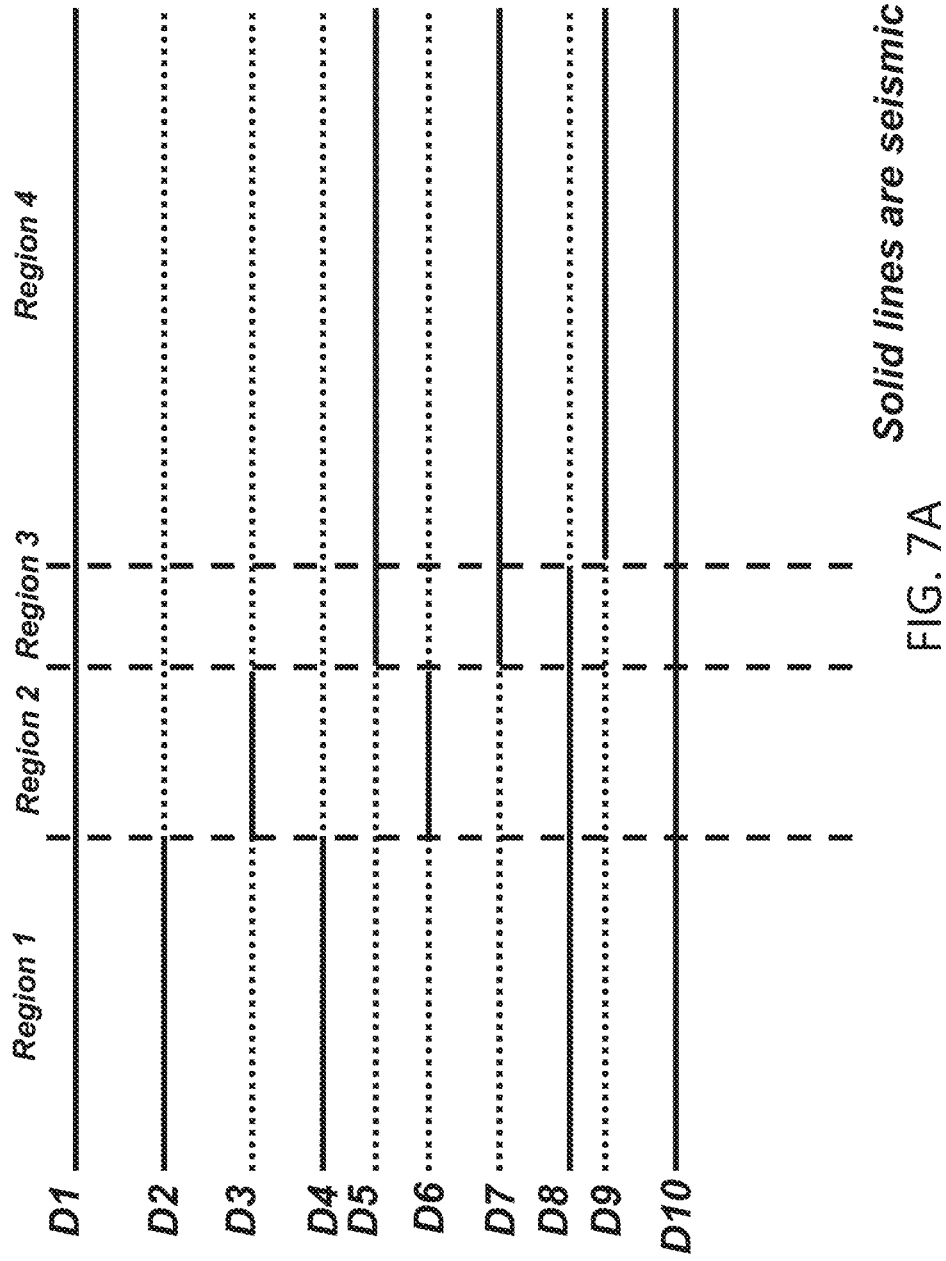
FIG. 7A is a diagram of a flattened seismic section, in accordance with some embodiments.

Detecting moiré patterns may be done by visual inspection or by an automated process by the computer. For example, detecting the moiré pattern might be done using a method such as described in FIG. 2. A seismic image with moiré patterns is received 20. The image is analyzed on each tau-surface, which is a horizontal plane for which tau is constant in order to calculate the magnitude of the image gradient of the events. This is done at high resolution to get as much detail as possible. Once the gradients on each tau-surface are calculated, edge detection is performed 24. A classic edge-detection method is the Canny algorithm; other commonly-used image processing filters designed to enhance edges include the Sobel and Gabor filters. After the edges have been detected, the normal vectors are calculated for each edge 26. It is then possible to identify locations where concentric or subsequent band edges have aligned normal vectors 28 which will be patterns with a stripe/band or ring nature, as moiré patterns have. FIG. 6A shows a moiré band detected on depth D2, which has the maximum radius of all bands in this example, and FIG. 6B shows the moiré band pattern detected on adjacent depth D3. FIG. 7A shows the same section as FIG. 5 but the moiré bands have been used to identify Regions 1-4. Region 1 is assumed to have no changes in the subsurface between seismic surveys. Regions 2, 3, and 4 have a velocity increase causing reflections to be imaged at a later depth in both the real and flattened domains.

Figure 7B:
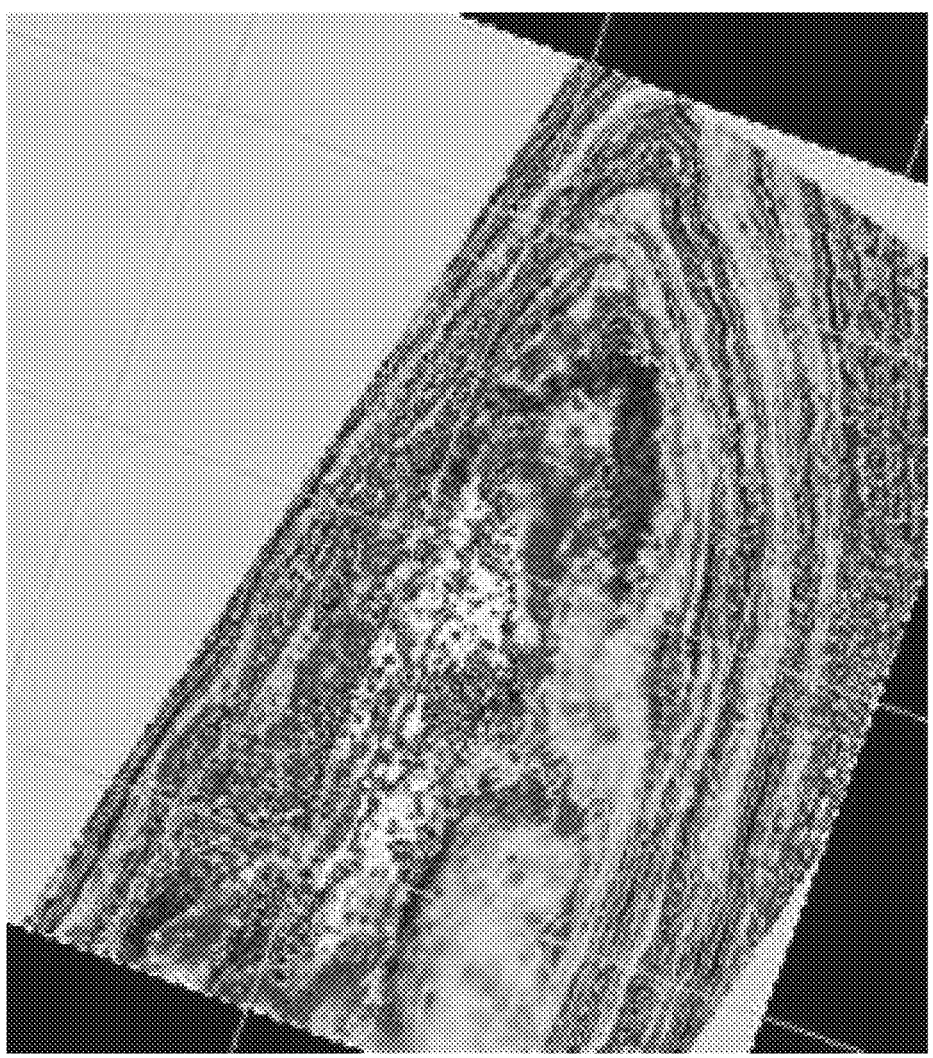
FIG. 7B is a map view depth slice through a flattened difference volume, in accordance with some embodiments.

FIG. 7B shows a depth slice through a flattened monitor image produced by method 100. This example is a realistic seismic image from the Steep Anticline Model (SAM). The depth slice displays the banding typical of moiré patterns.

In the depth domain, if direction of maximum band radius to the next smaller band radius is up, this corresponds to a velocity decrease within the area of the band. If direction of maximum band radius to the next smaller band radius is down, this corresponds to a velocity increase within the area of the band. Alternatively in the time domain, if direction of maximum band radius to the next smaller band radius is up, this corresponds to a velocity increase within the area of the band. If direction of maximum band radius to the next smaller band radius is down, this corresponds to a velocity decrease within the area of the band. In the example shown by FIGS. 5, 6A, and 6B, there is a velocity decrease. This velocity decrease can be calculated based on the detected moiré bands at different depths/times. This is possible because the tau volume calculated at operation 11 of method 100 can be used to compute the true depth and true time of the events detected as moiré patterns. The equation can be written as:

$$\Delta V = \frac{Z_{max} - Z_{band}}{t_{max} - t_{band}}$$

where $\Delta V$ is the velocity change, $Z_{max}$ is the true depth of the event with the maximum radius (D2 of example in FIGS. 5 and 6A), $t_{max}$ is the true time of the event with the maximum radius, $Z_{band}$ is the true depth of the event detected as a band other than the maximum, and $t_{band}$ is the true depth of the event detected as a band. The area that that has been affected by the velocity change lies between the outer radius of the event with the maximum radius (D2) and the inner radius of the band on the adjacent slice.

Referring again to FIG. 1, if no moiré patterns are detected, it is likely that there are no subsurface changes in the subsurface reservoir 16A. If moiré patterns are detected, there may be subsurface changes in the subsurface reservoir that can be analyzed 16B.

Once subsurface changes are detected and analyzed, they can be used to determine the efficacy and safety of the production plan implemented in the field. Further decisions may be made, impacting hydrocarbon production success. Overall, determining whether and where subsurface rock and fluid property changes have occurred will improve the quality of operational decisions.

Figure 9A:
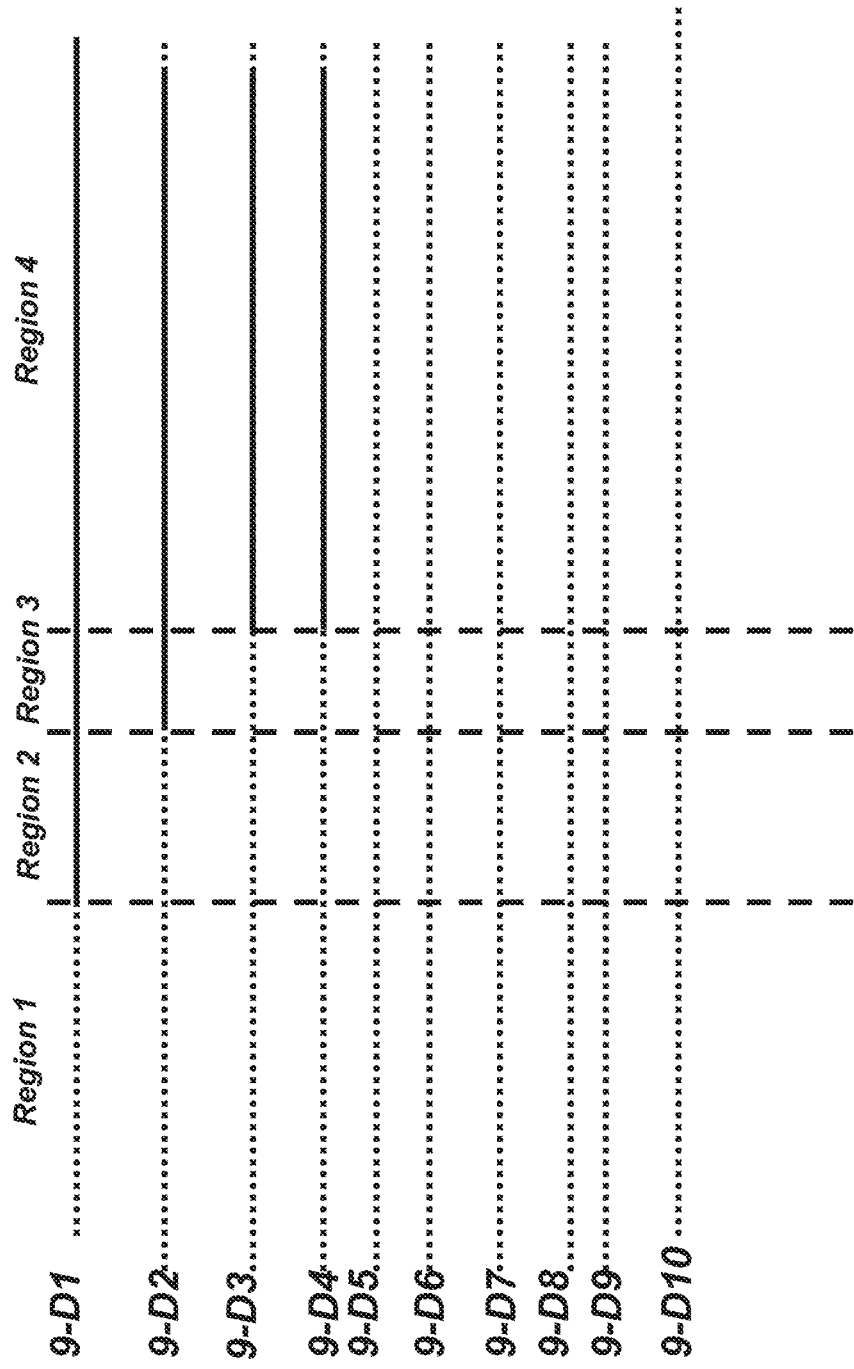
FIG. 9A is a diagram of a flattened seismic section, in accordance with some embodiments.

An alternative method for identifying subsurface rock and fluid property changes between the baseline and monitor seismic images is to subtract one from the other to create a difference volume in the structural domain and then detect moiré patterns in the difference volume. If there are no changes in the subsurface between the baseline and monitor surveys, the amplitude will be zero in the difference volume. If there are changes in some areas of the subsurface, the difference volume will have moiré patterns. The moiré patterns may be detected as described in FIG. 2 and explained above. An exemplary section can be seen in FIG. 9A which shows a section of the difference volume in which the moiré bands have been used to identify Regions 1-4 for depths 9-D1-9-D10. Here, region 1 has no changes between the baseline and monitor surveys so there are no seismic reflections. Regions 2, 3, and 4 have a velocity increase causing reflections to be imaged at a later depth in both the real and flattened domains.

Figure 9B:
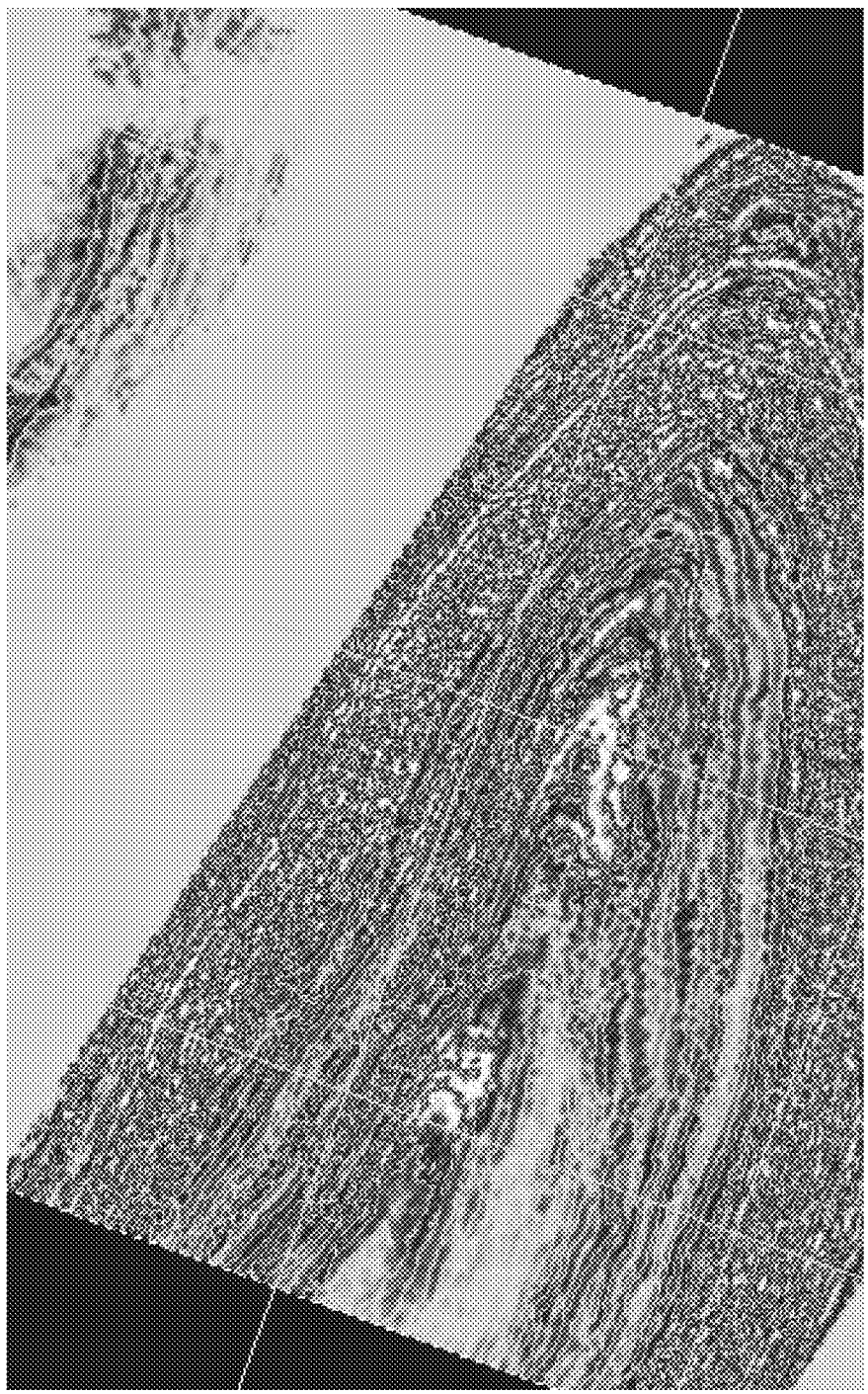
FIG. 9B is a map view depth slice through a difference volume, in accordance with some embodiments.

FIG. 9B shows a depth slice through a difference volume produced by the alternative method. This example is another realistic seismic image from the Steep Anticline Model (SAM). The depth slice displays the banding typical of moiré patterns.

Figure 8:
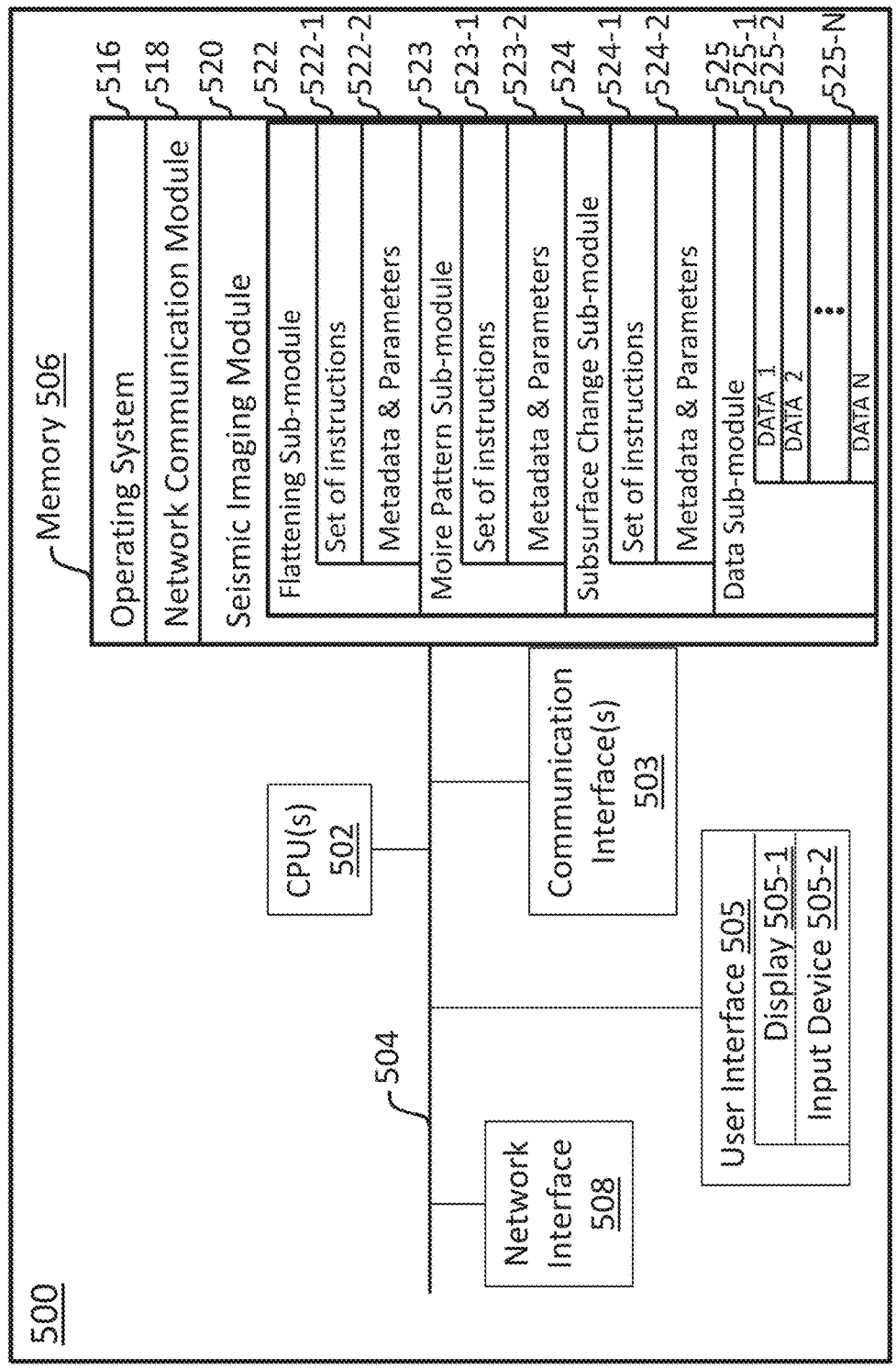
FIG. 8 is a block diagram illustrating a seismic imaging system, in accordance with some embodiments.

FIG. 8 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, seismic images, calculated dip corrections, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of method 100. Seismic imaging module 520 may include data sub-module 525, which handles the seismic dataset including data 525-1 through 525-N which may be, for example, traces, gathers, or slices. This seismic data is supplied by data sub-module 525 to other sub-modules.

The flattening sub-module 522 contains a set of instructions 522-1 and accepts metadata and parameters 522-2 that will enable it to contribute to operations 11 and 14 of method 100. Moiré pattern sub-module 523 contains a set of instructions 523-1 and accepts metadata and parameters 523-2 that will enable it to contribute to operation 15 of method 100. The subsurface change sub-module 524 contains a set of instructions 524-1 and accepts metadata and parameters 524-2 that will enable it to contribute operations 15 and 16A or 16B of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 8) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of facilitating enhanced production of a hydrocarbon reservoir using time-lapse seismic imaging, comprising:
    a. receiving a baseline digital seismic image representative of a subsurface volume of interest including the hydrocarbon reservoir;
    b. computing a baseline tau volume containing transforms that will flatten the baseline digital seismic image;
    c. receiving a monitor digital seismic image representative of the subsurface volume of interest;
    d. flattening the monitor digital seismic image using the baseline tau volume to generate a digital flattened monitor image;
    e. detecting moiré patterns in the digital flattened monitor image;
    f. computing a change in velocity based on the moiré patterns;
    g. identifying physical changes in the subsurface volume of interest based on the digital flattened monitor image and the change in velocity; and
    h. facilitating enhanced production of the hydrocarbon reservoir based on the identified physical changes.

2. The method of claim 1 further comprising making a decision regarding budgetary planning, obtaining mineral and lease rights, signing well commitments, permitting rig locations, designing well paths and drilling strategy, preventing subsurface integrity issues by planning proper casing and cementation strategies, or selecting and purchasing appropriate completion and production equipment, or any combination thereof, based on the digital flattened monitor image and the identified physical changes.

3. The method of claim 1 wherein the detecting moiré patterns comprises calculating image gradients of events on a tau-surface, performing edge detection on the image gradients to obtain edges, calculating normal vectors from the edges, and identifying locations where neighboring edges have aligned normal vectors.

4. A computer system, comprising:
    one or more processors; a user interface including a graphical display;
    memory; and
    one or more programs, wherein the one or more programs are stored in the memory and configured to be executed by the one or more processors, the one or more programs including instructions that when executed by the one or more processors cause the computer system to:
    a. receive a baseline digital seismic image representative of a subsurface volume of interest including a hydrocarbon reservoir;
    b. compute a baseline tau volume containing transforms that will flatten the baseline digital seismic image;
    c. receive a monitor digital seismic image representative of the subsurface volume of interest;
    d. flatten the monitor digital seismic image using the baseline tau volume to generate a digital flattened monitor image;
    e. detect moiré patterns in the digital flattened monitor image;
    f. compute a change in velocity based on the moiré patterns;
    g. identify physical changes in the subsurface volume of interest based on the digital flattened monitor image and the change in velocity;
    h. display at least one of the identified physical changes and the digital flattened monitor image on the user interface; and
    i. facilitate enhanced production of the hydrocarbon reservoir based on the identified physical changes.

5. A non-transitory computer readable storage medium storing one or more programs, the one or more programs comprising instructions, which when executed by an electronic device with one or more processors, a user interface including a graphical display, and memory, cause the device to:
    a. receive a baseline digital seismic image representative of a subsurface volume of interest including a hydrocarbon reservoir;
    b. compute a baseline tau volume containing transforms that will flatten the baseline digital seismic image;
    c. receive a monitor digital seismic image representative of the subsurface volume of interest;
    d. flatten the monitor digital seismic image using the baseline tau volume to generate a digital flattened monitor image;
    e. detect moiré patterns in the digital flattened monitor image;
    f. compute a change in velocity based on the moiré patterns;
    g. identify physical changes in the subsurface volume of interest based on the digital flattened monitor image and the change in velocity;
    h. display at least one of the identified physical changes and the digital flattened monitor image on the user interface; and
    i. facilitate enhanced production of the hydrocarbon reservoir based on the identified physical changes.

* * * * *